(12) United States Patent
Faith

(10) Patent No.: US 7,051,611 B2
(45) Date of Patent: May 30, 2006

(54) METHOD FOR PRODUCING A SHAFT AND DEVICE CONTAINING ONE SUCH A SHAFT

(75) Inventor: Lothar Fauth, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 279 days.

(21) Appl. No.: 10/332,836

(22) PCT Filed: May 3, 2001

(86) PCT No.: PCT/DE01/01684

§ 371 (c)(1),
(2), (4) Date: Mar. 19, 2003

(87) PCT Pub. No.: WO02/05985

PCT Pub. Date: Jan. 24, 2002

(65) Prior Publication Data

US 2003/0159533 A1 Aug. 28, 2003

(30) Foreign Application Priority Data

Jul. 14, 2000 (DE) .............................. 100 34 410

(51) Int. Cl.
 *F16H 1/16* (2006.01)
(52) U.S. Cl. .................. 74/425; 29/893.32; 74/459
(58) Field of Classification Search .............. 74/425, 74/458, 459; 403/279, 282; 29/893.31, 29/893.32; 384/569, 492, 625, 912
See application file for complete search history.

(56) References Cited

U.S. PATENT DOCUMENTS

| 1,329,805 | A | * | 2/1920 | Schurr ........................ 409/38 |
| 5,408,897 | A |   | 4/1995 | Klinar |
| 6,223,615 | B1 | * | 5/2001 | Huck .......................... 74/425 |
| 6,352,006 | B1 | * | 3/2002 | Kurashita .................... 74/409 |
| 6,682,227 | B1 | * | 1/2004 | Grell et al. ................. 384/569 |
| 6,722,992 | B1 | * | 4/2004 | Hirabayashi et al. ......... 464/29 |
| 6,843,148 | B1 | * | 1/2005 | Marcel ........................ 74/425 |
| 2002/0096005 | A1 | * | 7/2002 | Oka et al. .............. 74/388 PS |
| 2002/0112555 | A1 | * | 8/2002 | Chikaraishi et al. .... 74/388 PS |
| 2003/0091256 | A1 | * | 5/2003 | Grell et al. ................. 384/575 |
| 2003/0159533 | A1 | * | 8/2003 | Fauth .......................... 74/425 |
| 2003/0196505 | A1 | * | 10/2003 | Hoehn et al. ................. 74/425 |

FOREIGN PATENT DOCUMENTS

| DE | 297 02 525 U1 | 7/1998 |
| FR | 2 714 856 A | 7/1995 |
| GB | 1 137 035 A | 12/1968 |

OTHER PUBLICATIONS

Patent Abstracts of Japan vol. 017, No. 271 (M-1417), May 26, 1993 & JP 05 007970, Jan. 19, 1993.
Patent Abstracts of Japan vol. 008, No. 073 (M-287), Apr. 5, 1984 & JP 58 218337 A.., Dec. 19, 1983.

* cited by examiner

*Primary Examiner*—David Fenstermacher
(74) *Attorney, Agent, or Firm*—Striker Striker & Stenby

(57) ABSTRACT

A method for producing a shaft and a device containing such a shaft (22), in particular an armature shaft (22) of an electric motor drive (10), which shaft is held by at least one shaft bearing (43), includes forming a bearing surface (40) for guidance in a shaft bearing (42) onto the shaft (22) at at least one point by positive displacement of material.

9 Claims, 2 Drawing Sheets

METHOD FOR PRODUCING A SHAFT AND DEVICE CONTAINING ONE SUCH A SHAFT

BACKGROUND OF THE INVENTION

The invention relates to a method for producing a shaft and to a device containing such a shaft [as generically defined by the preambles to the independent claims].

With German Utility Model GM 297 02 525.2, a device has become known that is used for instance for displacing windows, sliding roofs, or seats. The object of this teaching is to avoid unwanted longitudinal play of an armature shaft, by means of a rubber insulator attached to the face end. A worm is pressed onto the armature shaft and transmits the torque of the electric motor to the worm wheel. The forward end of the armature shaft is guided in a rotary bearing receiving bush. This prevents the worm from deviating radially and thereby interfering with the meshing of the worm and wheel or destroying teeth. This is especially important when strong radial forces occur between the worm and the worm wheel, especially whenever the adjusting part runs up against a stop. From a production standpoint, pressing the completed worm onto the armature shaft is a very complicated and expensive process. Directly rolling the worm onto the armature shaft, conversely, is much less expensive. Then, however, the process creates a lengthy trailing region of the worm that can be used for neither transmitting force to the worm wheel nor bearing the armature shaft. As a result, especially in applications in which there is little installation space available, the end of the armature shaft can no longer be braced, or else complicated production processes are required to achieve such a support.

SUMMARY OF THE INVENTION

The method of the invention [having the characteristics of claim 1] has the advantage that regardless of the production process for the worm, a bearing surface for supporting the armature shaft can be created in a very simple way. By means of cold forming, and by not using metal-cutting machining, it is possible to produce a bearing point produced economically. The transition zone from the completed worm to the bearing can be kept quite short, and the meshing of teeth is moved close to the bearing point. This makes safe and reliable adjusting operation possible, in which damage to the teeth is effectively avoided.

By means of the characteristics recited in the dependent claims, advantageous refinements of the method of claim 1 are possible. From a production standpoint, it is particularly important first to form on a worm over a certain region of the shaft, for instance using a rolling method. From the method standpoint, relatively lengthy trailing regions are created on the ends of the worm that can be used for neither force-transmitting toothing nor as a bearing face. Here it is especially advantageous for these trailing regions of the shaft to be reshaped into a bearing surface by means of positive displacement of material. Above all with the goal of saving installation space, it is an important criterion to make the bearing surface in the immediate vicinity of the effective tooth engagement of the worm. By means of positive displacement of material, portions in the middle region of the worm can also be very easily reshaped into a bearing surface, without creating lengthy transitional zones between the bearing surface and the worm.

If the worm and the bearing surface are formed on by positive displacement of material on the same machine tool, then for this operation the shaft has to be chucked only once. One complete work step is dispensed with, which makes fast and economical production possible.

Material reshaping by means of rollers proves to be especially favorable. For this purpose, smoothing-rolling tools that are simple to manufacture can be employed. The desired width of the bearing surface is predetermined by the width of the smoothing-rolling tool. As a result, a radial motion of the rolling cylinder to the armature shaft suffices. This makes for an extremely easy process step.

By means of the positive displacement of material, not only is a diameter reduction as in the metal-cutting method possible, but filling up of gaps in the material is also possible. This enables the production of a greater bearing diameter, preferably of approximately the same diameter as the original shaft. Weak points in the armature shaft from a lesser bearing diameter are thus avoided. Moreover, the surface quality of a bearing surface produced by cold forming in this way is greater.

It is especially advantageous to form the bearing surface onto the end of the shaft. This is where the greatest possible deflection of the armature shaft occurs, generated by the force transmission of the teeth. If the shaft is securely guided on its end by a bearing, an adequate tooth engagement is assured. In order that the shaft need not be unnecessarily long, it is especially advantageous in this arrangement that by means of positive displacement of material, a very sharp transition from the bearing surface to the effective tooth engagement is created.

It is also advantageous if the bearing surface is formed on with a width at least equivalent to the pitch height of an encompassing thread course of the worm. Since the material in the region of the worm teeth is compressed more strongly than in the region of the tooth gaps, the regions of the former worm teeth are harder and can thus carry greater loads. If the length of a bearing point is equivalent to at least the pitch of a set of teeth, then over the circumference of the bearing point, high surface quality with a spiral course is assured.

The device according to the invention having the characteristics of independent claim 8 has the advantage that a high-quality bearing surface is created with a very short transition zone to the force-transmitting worm region.

If the bearing surface is embodied at the end of the shaft in the form of a support journal, then it can be guided very effectively in a rotary bearing receiving bush. This prevents the worm from deviating radially. This makes a safe adjustment operation possible.

DESCRIPTION OF THE DRAWINGS

One exemplary embodiment of a device of the invention is shown in the drawing and explained in further detail in the ensuing description.

DESCRIPTION OF THE PREFERRED EMBODIMENTS

Figure 1:
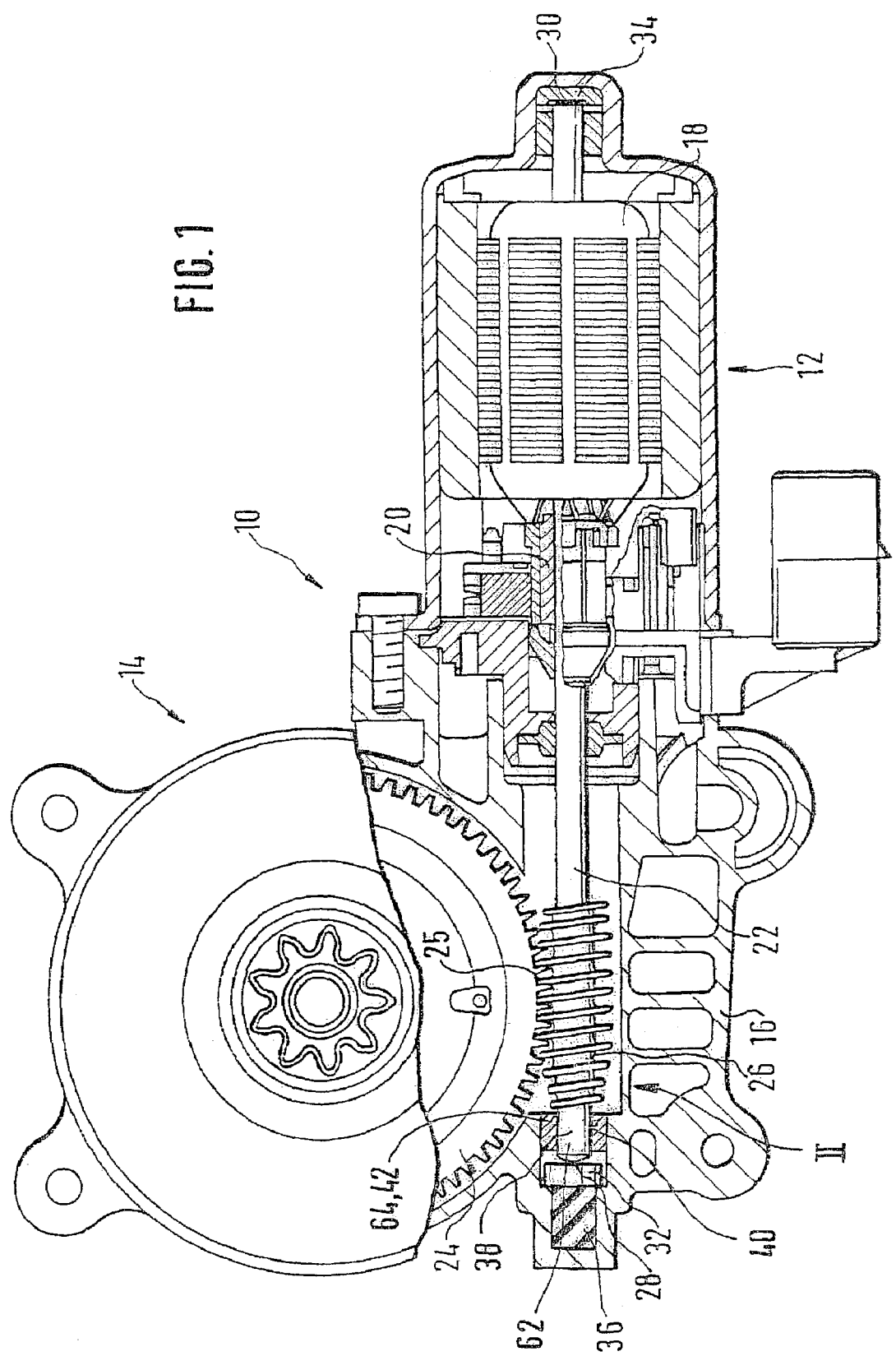
FIG. 1 shows a device in section.

In FIG. 1, an adjusting drive 10 is shown, with a motor 12 and a multi-part housing 16 surrounding a gear 14. The motor 12 is commutated electrically and has an armature 18, a commutator 20, and an armature shaft 22, supported at multiple points, which extends into the region of the gear 14. A worm 26 is mounted on the armature shaft 22 and communicates with a worm wheel 24 via a set of teeth 25. On the face ends 28 and 30 of the armature shaft 22, this shaft is braced longitudinally on the housing 16, or part of the housing 16, via stop disks 32 and 34, and via a rubber insulator 36. A bearing surface 40 is formed onto one end 38 of the armature shaft 22 by means of positive displacement of material. This bearing surface 40 is guided in a shaft bearing 42, to prevent the armature shaft 22 from escaping from the teeth 25.

Figure 2:
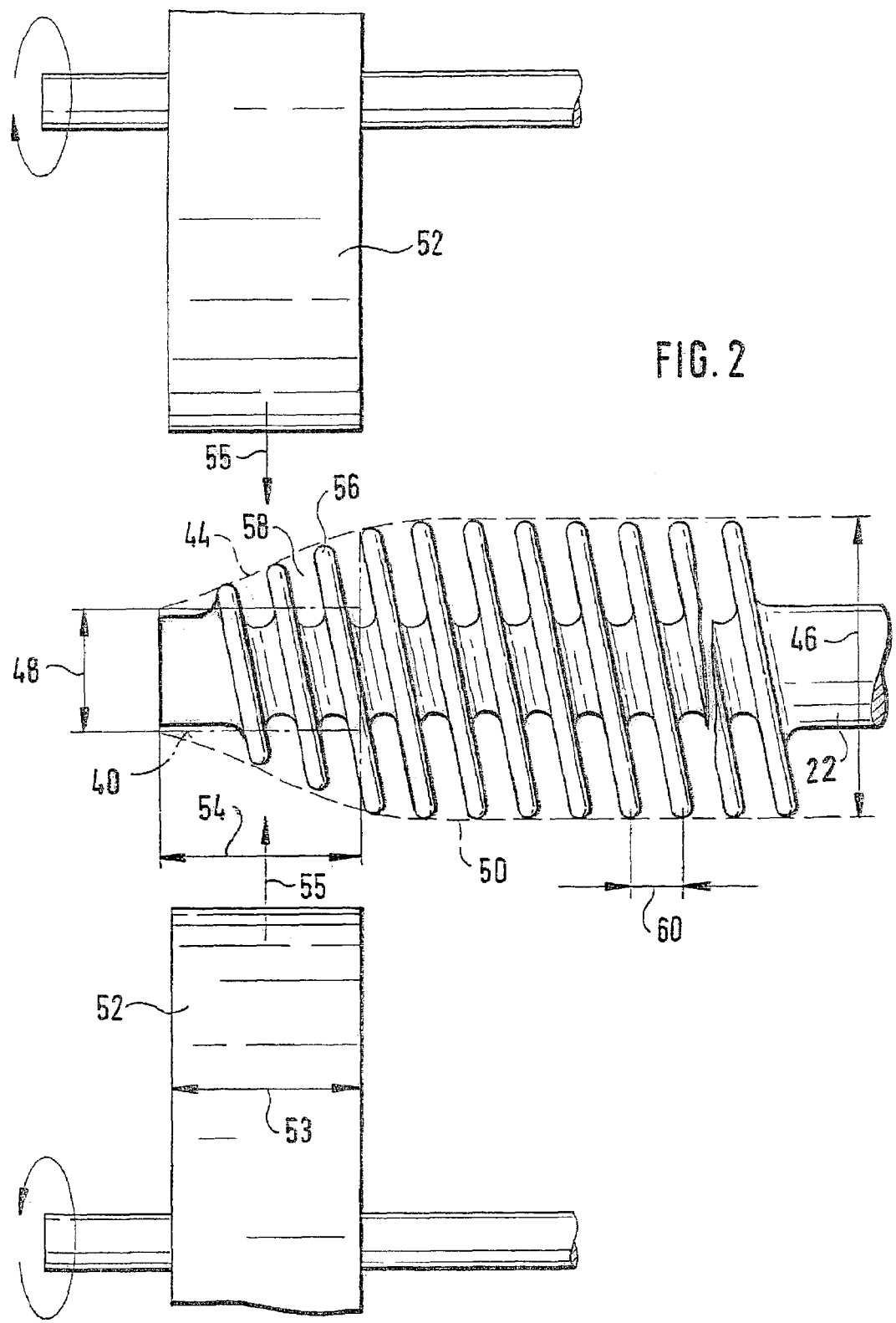
FIG. 2 shows an enlarged detail of the shaft marked II in FIG. 1.

FIG. 2, showing an enlargement of the end 38 of the armature shaft 22, schematically illustrates the production process of the bearing surface 40. First, the worm 26 is rolled onto the armature shaft 22. For production reasons, this creates a trailing region on the end of the worm 26, in the course of which region the outer diameter 46 of the worm, in the region of the force-transmitting teeth 25, decreases to the original diameter 48 of the end of the armature shaft 22. This is illustrated in FIG. 2 by an envelope curve 50 (in dashed lines). In this trailing region 44, a bearing surface 40 is now formed on by means of rolling. To that end, two rotating smoothing-rolling tools 52 are moved radially toward the armature shaft 22. In the simplest case, the smoothing-rolling tools 52 comprise circular disks of a certain thickness 53, which is equivalent to the width 54 of the formed-on bearing surface 40. As the smoothing-rolling tools 52 are advanced radially (represented by arrows 55 in FIG. 2), worm teeth 56 are pressed into tooth gaps 58, until a smooth bearing surface is created, whose diameter 48 is approximately equivalent to that of the original shaft 22. The shaft profile after the bearing surface 40 has been formed on is shown in FIG. 2 as a dot-dashed line 57. The advancement of the rolling tools 52 can, however, also be ended earlier, so that the worm teeth 56 are only partially deformed. This does not create a smooth bearing surface 40. If the width 54 of the bearing surface 40 is greater than the pitch height 60 of an encompassing thread course of the worm 26, however, a radially symmetrical shaping of the bearing surface 40 is nevertheless assured.

Alternatively, smoothing-rolling tools 52 that are not circular can be used. If the rolling disk is supported eccentrically or embodied spirally, then its advancement radially to the armature shaft 26 can be omitted. It is also possible to narrower smooth-running tools 52 and to achieve the desired width 54 via an axial advancement. Regardless of the special embodiment of the rolling tools, the rolling of the worm 26 and of the bearing surface 40 can be done in the same chucking position of the armature shaft 22.

In a further variation of the exemplary embodiment, the worm 26 is formed on by some other method than rolling. For instance, this can be a metal-cutting method, or the worm can be pressed as a separate component onto the shaft. Regardless of how the worm 26 is produced, in this version as well it is possible for a bearing surface 40 to be formed onto the armature shaft 22 at any arbitrary point by means of positive displacement of material in a simple way, as long as the material properties of the material used allow this.

In FIG. 1, the bearing surface 40 is form onto the end 38 of the armature shaft 22 by means of positive displacement of material. Here the bearing surface 40 forms a support journal 62, which is guided in a very simple way by a rotary bearing receiving bush 64. This slide bearing is very economical to produce and easy to install. In an alternative version, the bearing surface 40 is formed on in the region of the worm 26, between the teeth 25 and the commutator 20. The bearing is more complicated to produce then. In addition, the end 38 of the armature shaft 22 can for instance be braced only on one end, to prevent the armature shaft 22 from deviating at its end 38. To that end, once again a bearing surface is formed onto the end 38 of the armature shaft 22.

The invention claimed is:

1. A method of producing a shaft of an electric motor drive, which shaft is held by at least one shaft bearing, the method comprising the steps of forming first a worm onto the shaft; and after said forming the worm onto the shaft, forming at least one bearing surface for a guiding in a shaft bearing onto the shaft at at least one point in the region of the worm by means of positive displacement of material that includes at least partially cold-forming worm teeth in the positive displacement of material, and forcing a tooth material into tooth gaps to form said at least one bearing surface.

2. A method as defined in claim 1; and further comprising performing the forming of the worm and the forming on of the bearing surface on a same machine tool by means of positive displacement of material.

3. A method as defined in claim 1, wherein the forming on of the bearing surface includes forming on by means of rolling of the shaft.

4. A method as defined in claim 1; and further comprising effecting the forming on of the bearing surface at an end of the shaft.

5. A method as defined in claim 1; and further comprising providing a width of the bearing surface equivalent to at least one pitch height of the worm.

6. A device for adjusting components belonging to a motor vehicle, comprising an electric drive motor that has an armature shaft and having a worm gear downstream of the electric drive motor, which worn gear is operatively connected to the drive motor via an armature shaft and the armature shaft is produced by a method of claim 1, and a bearing surface provided in the region of the worm for guidance in the shaft bearing, the bearing surface being formed onto the armature shaft at at least one point by means of a positive displacement of material so that teeth are at least partially cold-formed in the positive displacement of material and a tooth material is forced into tooth gaps so as to form the bearing surface.

7. A device as defined in claim 6, wherein the bearing surface is located directly at an end of the shaft.

8. A device as defined in claim 6, wherein the bearing surface forms a support journal which is guided in a rotary bearing receiving bush.

9. A method for producing a shaft of an electric motor drive, which shaft is held by at least one shaft bearing, the method comprising the steps of forming a bearing surface onto the shaft at at least one point by means of positive displacement of the material, said forming including forming at least one bearing surface by means of rolling, using smooth-rolling tools.

* * * * *